Nov. 13, 1934.  C. K. SALISBURY  1,980,553
POWER OPERATED TRACTOR GUIDE
Filed June 16, 1930  6 Sheets-Sheet 1
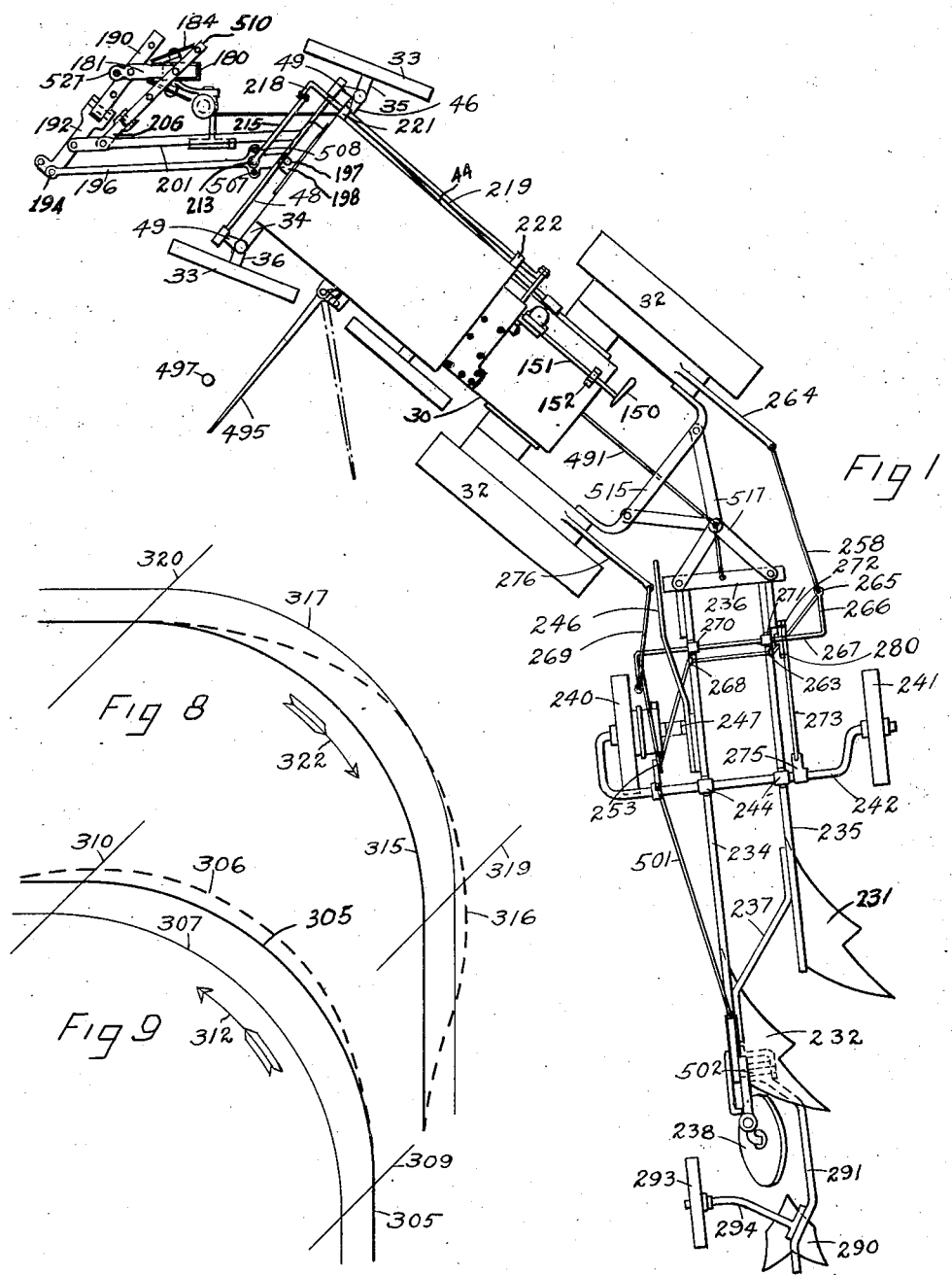
INVENTOR
Charles K Salisbury Nov. 13, 1934.　　　　C. K. SALISBURY　　　　1,980,553
POWER OPERATED TRACTOR GUIDE
Filed June 16, 1930　　　　6 Sheets-Sheet 2
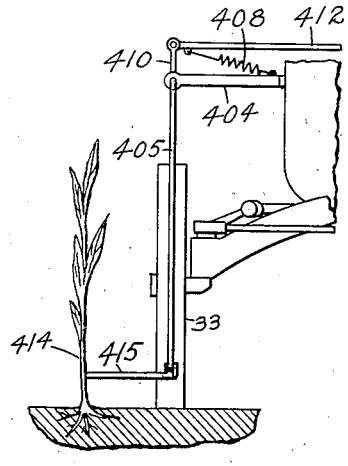
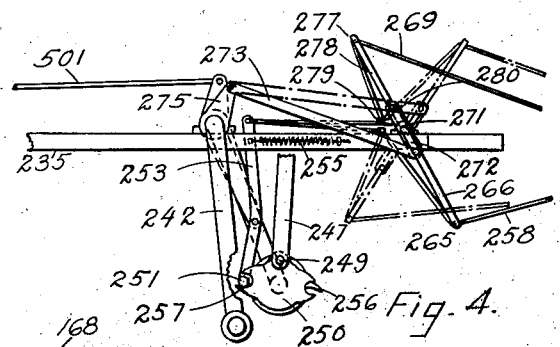
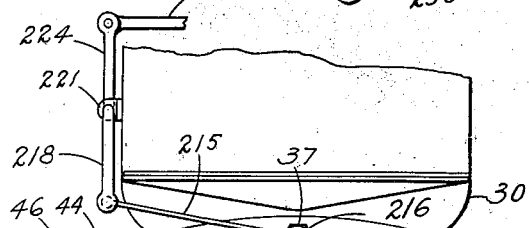
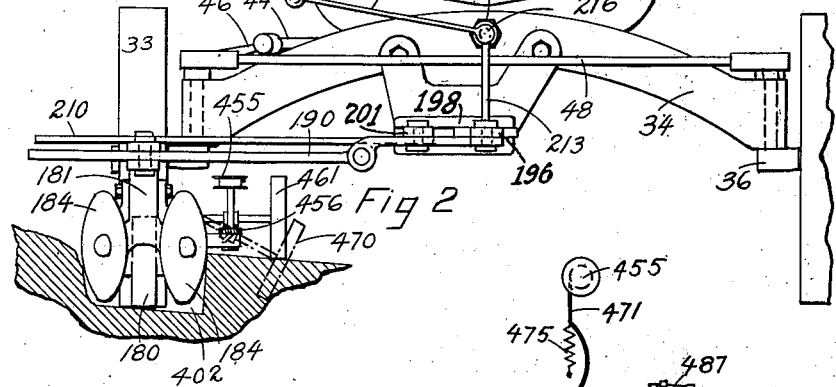
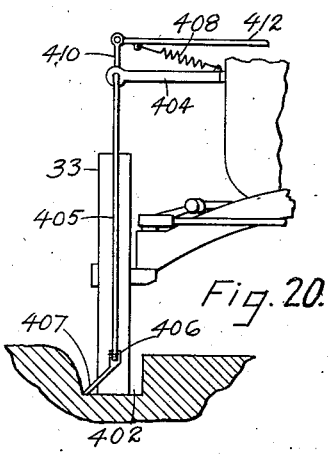
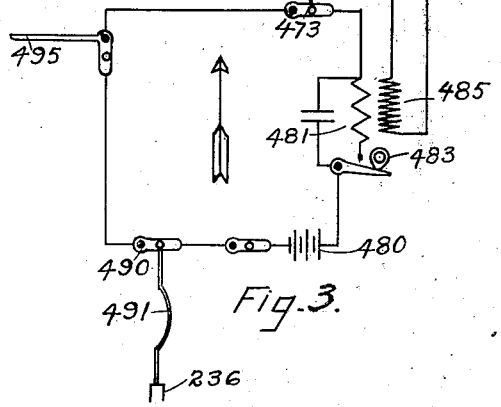
INVENTOR
Charles K. Salisbury Nov. 13, 1934.   C. K. SALISBURY   1,980,553
POWER OPERATED TRACTOR GUIDE
Filed June 16, 1930   6 Sheets-Sheet 3

INVENTOR
Charles K. Salisbury

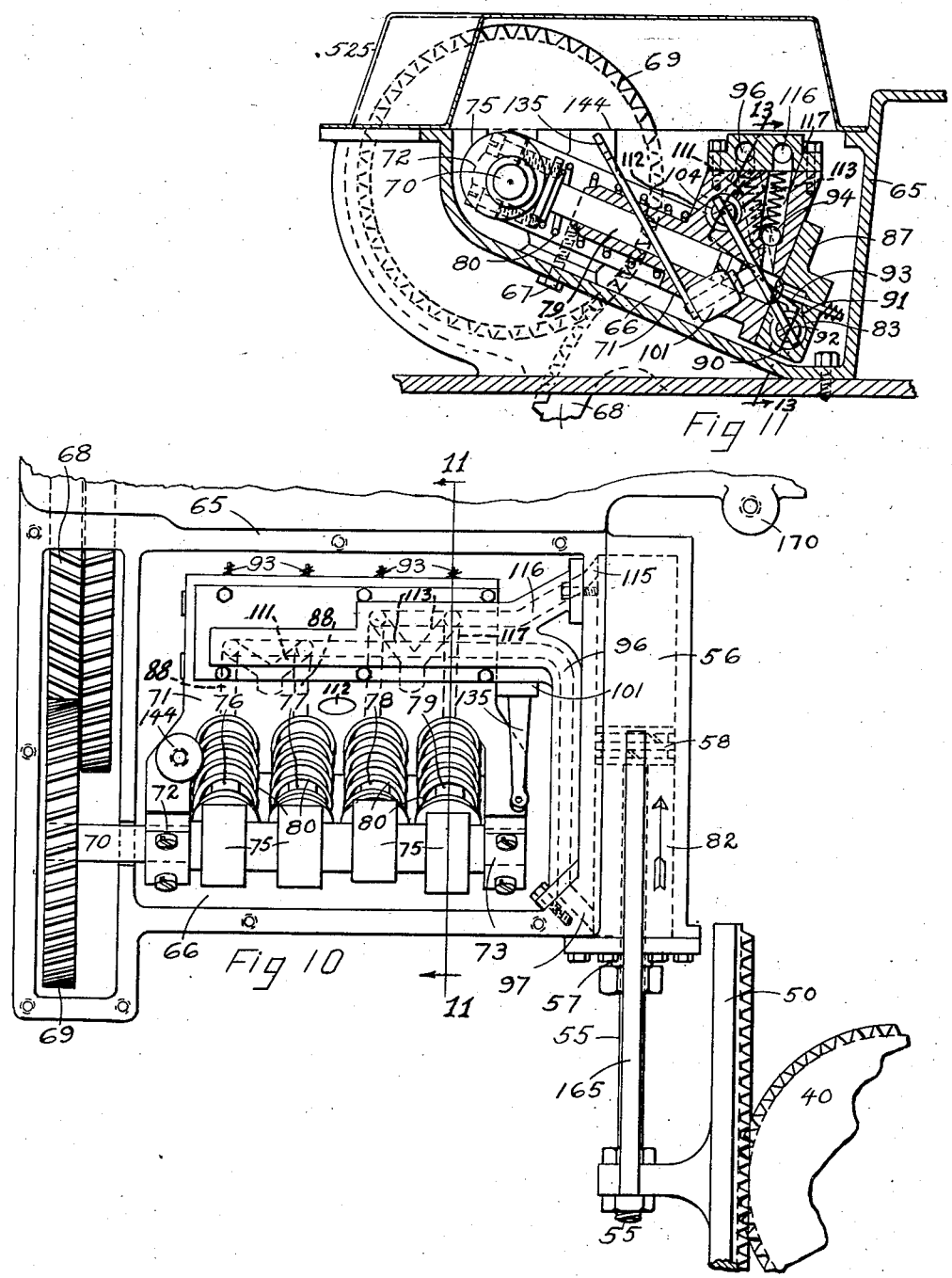

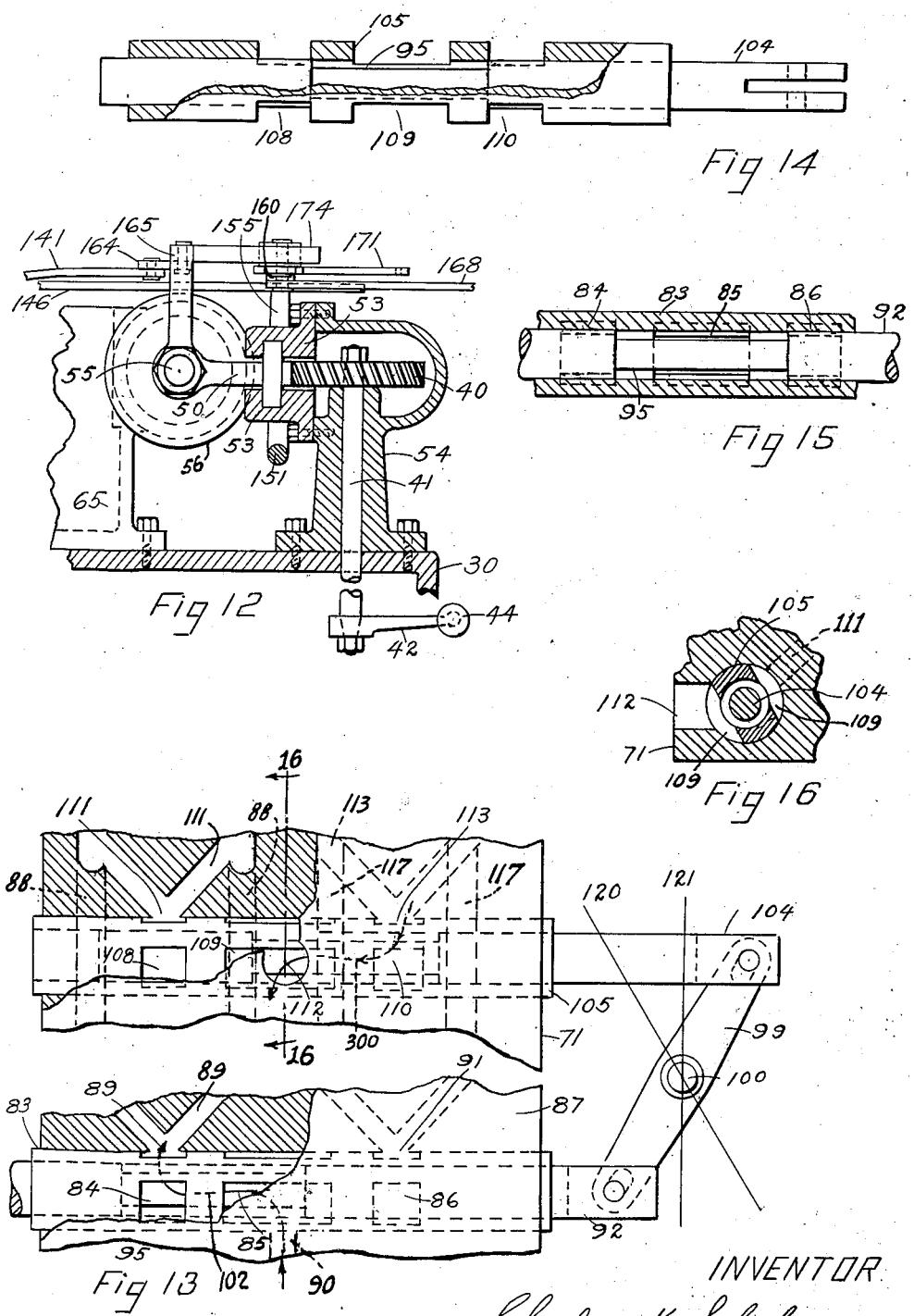

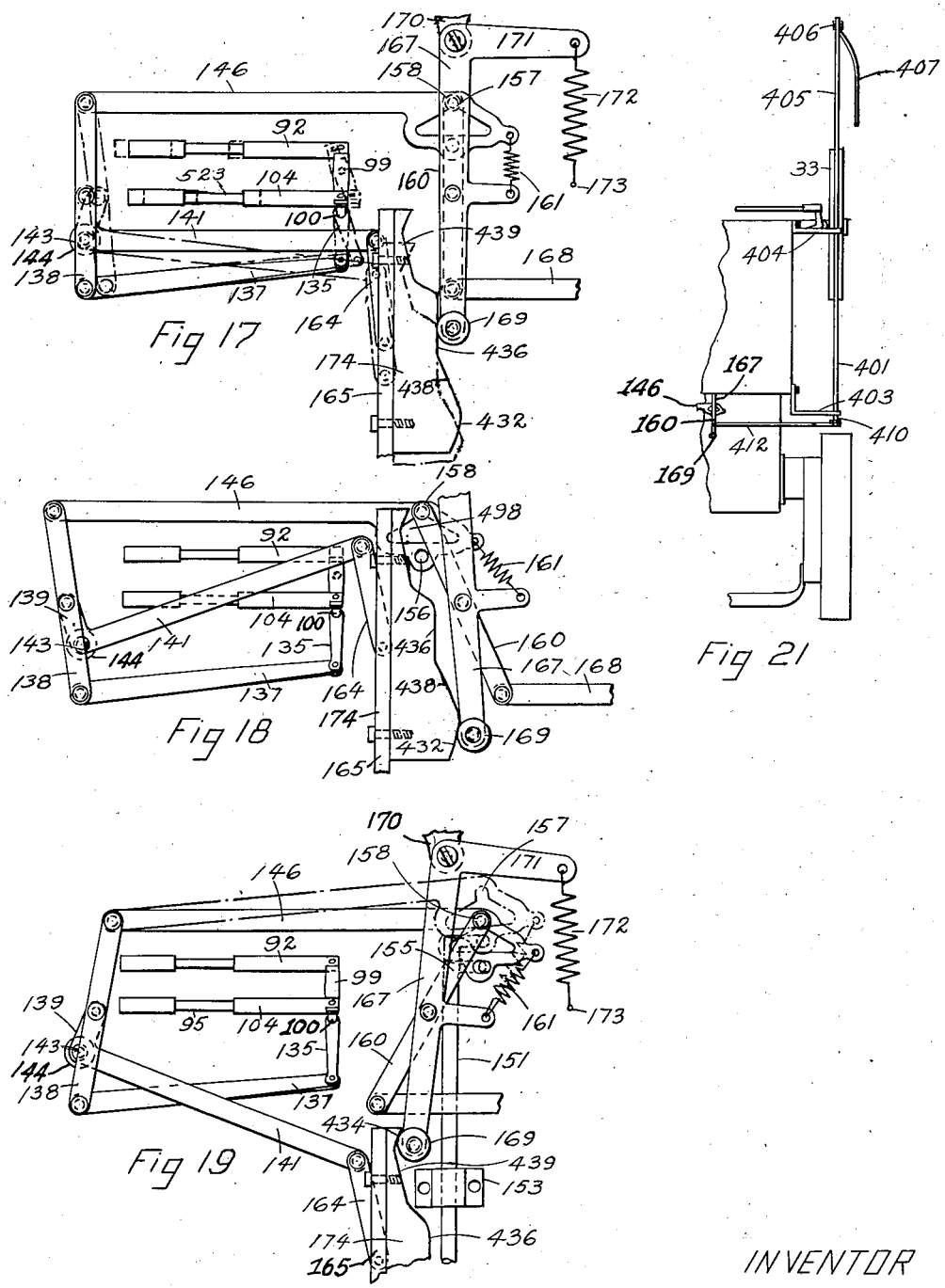

Patented Nov. 13, 1934

1,980,553

UNITED STATES PATENT OFFICE 1,980,553

POWER OPERATED TRACTOR GUIDE

Charles K. Salisbury, Waterloo, Iowa

Application June 16, 1930, Serial No. 461,663

15 Claims. (Cl. 97—49)

My invention relates to guide mechanism contacting with a plowed furrow or other path to guide a tractor in its steering movements by power and is an improvement in the mechanism shown in the patent issued to E. W. Burgess, No. 1,351,741.

The objects of my invention are: to provide a power guide that will limit the movement of the power operated steering wheels of the tractor to the movement of the contact arm of the guide, to provide a power guide that will permit of free movement of the contact arm beyond the point where power steering movement is started by the contact arm, to provide means whereby the tractor follows a different path at the corners relative to the contact arm than it does when moving straight ahead, to provide a manual control in combination with the contact arm or guide that may be readily substituted therefor to operate the power steering mechanism of the tractor, and to provide efficient operating mechanism.

With the above and other objects in view, my invention consists of the power operated tractor guide herein described and all equivalents.

Referring to the accompanying drawings in which like characters of reference indicate like parts throughout the several views;

Figure 1 is a plan view of tractor and guide mechanism showing position of parts when turning a left hand corner.

Figure 2 is a front view of tractor and contact arm mechanism.

Figure 3 is a diagrammatic view showing safety stopping mechanism.

Figure 4 is a side view of an automatic plow raising and lowering mechanism.

Figure 8 is a diagrammatic plan view showing the path taken by the tractor when turning a right hand corner in plowing.

Figure 9 is a diagrammatic plan view showing the path taken by the tractor when turning a left hand corner in plowing.

Figure 10 is a detailed plan view of a hydraulic power operating mechanism adapted to steer the tractor by movement of its steering wheels.

Figure 11 is a sectional side view of Figure 10 taken on line 11—11.

Figure 12 is a rear end view of a hydraulic cylinder 56 showing its operating connections to the steering mechanism.

Figure 13 is a view of a portion of the hydraulic power mechanism partially sectioned on line 13—13 of Figure 11 to show control valves.

Figure 14 is a side view of the outlet control valve in its sleeve which is in partial section.

Figure 15 is a side view of the inlet control valve in its sleeve which is in section.

Figure 16 is a view sectioned on line 16—16 of Figure 13 showing position of the outlet valve and associated parts.

Figure 17 is a plan view showing the control valves without sleeves to show the position of the control valves, the differential lever and its connections, the governor plate, and the differential governor bar when the tractor is moving straight ahead and the steering mechanism is in its straight ahead position.

Figure 18 is a plan view to show the position assumed by the control valves, the differential lever and its connections, the differential governor bar and governor plate with associated parts when the tractor is turned to the left to the desired degree and the steering mechanism has completely responded.

Figure 19 is a plan view to show the position assumed by the control valves, the differential lever and its connections, the differential governor bar and governor plate and associated parts when the tractor is turned to the right to the full extent required by the guide arm and the steering mechanism has fully responded.

Figure 20 is a front view of a modification of the guide arm used in plowing.

Figure 21 is a plan view of the modification shown in Figure 20.

Figure 22 is a front view of a modification of the guide arm used with standing grain.

Figure 7:
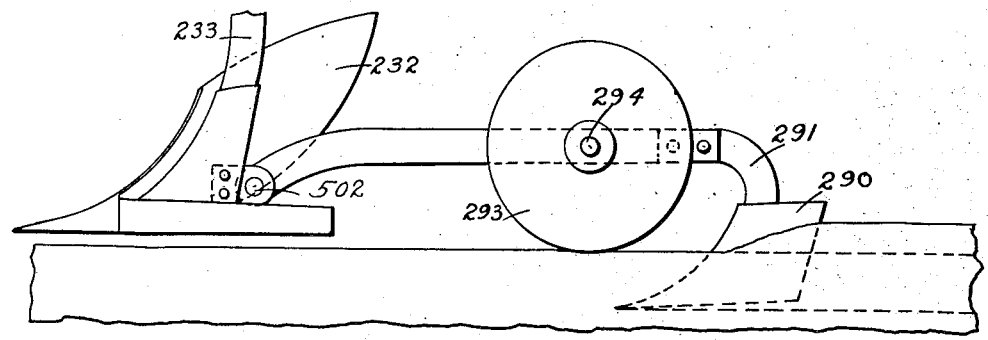
Figure 7 is a side view of a furrow marker.

The tractor consists of an internal combustion engine mounted on a frame 30, Figures 1 and 2, which is provided with drive wheels 32 and with guide wheels 33.

The steering wheels are pivoted to a front axle 34 by means of stub axles 35 and 36. The axle 36 is provided with an arm 49 to which one end of a tie rod 48 is pivoted. The other end of the tie rod is pivoted to an arm 49 of the stub axle 35 which is also provided with an arm 46 to which the forward end of a drag rod 44 is pivoted. At its opposite end the drag rod is pivoted to an arm 42 which is rigidly secured to the lower end of a vertical shaft 41 as indicated in Figure 1 and as shown in detail in Figure 12. This shaft extends through the frame 30 and through bearings in a worm wheel housing 54 rigidly secured to the top of the tractor frame, Figures 1 and 12. To the upper end of the shaft 41 is secured a worm wheel 40 to move therewith. A toothed rack 50, Figures 1, 10, and 12, meshes with the worm wheel and is held in sliding mesh by two slide blocks 53, Figure 12, secured to the worm wheel housing.

The toothed rack is secured to the rearward extending end of a piston rod 55, Figures 10 and 12, which passes through a stuffing box 57, Figure 10, and is secured to a piston 58, Figure 10, which has a very close sliding fit in a hydraulic cylinder 56, Figures 10 and 12, which is secured to the tractor frame, and any movement of the piston is transmitted to the steering wheels.

The piston 58 is moved in the direction of an arrow 82, Figure 10, by means of hydraulic pressure developed by two alternately operating plunger pumps 76 and 77, Figure 10, and moved in the opposite direction by two plunger pumps 78 and 79. These pumps are in pairs of alternate power strokes to give more uniform motion to the piston than would a single pump.

Movement of the piston 58 in the direction of the arrow 82 moves the steering wheels to steer toward the left, and movement of the piston in the opposite direction moves the steering wheels to steer toward the right.

The pump plungers are reciprocated during the power stroke by individual cams 75, Figures 10 and 11, mounted on a rotating shaft 70 held in bearings 72 and 73 and driven by the tractor engine through gears 68 and 69. The pump plungers are operated on the suction stroke by means of springs 80.

The pumps and their operating and control mechanism are contained in an oil tight pump case 65, Figures 1, 10, 11, and 12, which is provided with an oil tight cover 525, Figure 11.

Although all pump plungers reciprocate continuously, no pressure will be developed by any one of them unless oil contained in the pump case 65 is permitted to be drawn into the pump during its suction stroke.

Admission of oil to either set of pumps on their suction stroke is permitted by an inlet control valve 92, Figures 15, 11, 13, 17, 18, and 19, having a very close sliding fit in its sleeve 83. The sleeve is provided with ports 84 and 86, Figures 15 and 13, and with a central opening 85, Figure 15, and is forced tightly into a hole bored into a pump head 87, Figures 11 and 13, so that its port 84 connects with a duct 89, Figure 13, its port 86 connects with duct 91, and its central opening 85 connects with an inlet 90 through which oil is admitted from the pump case. The inlet valve 92 is provided with a reduced portion 95 of the same length as the distance between the inner ends of the ports 84 and 86 and when the valve is in its mid position both ports are closed. Upon slight movement of the valve 92 in either direction, one of the ports is opened to like extent.

When oil is permitted to be drawn into the pump 79, shown in partial section in Figure 11, it passes through a spring closed inlet check valve 93 and is forced during the power stroke through a spring closed outlet check valve 94. The pumps 76, 77, and 78 are each likewise provided with inlet and outlet valves of the same operation and construction as shown for pump 79 and the pump 78 draws its charge of oil through the same inlet port 86, Figure 13, as does the pump 79. After being forced through its outlet check valve 94 the oil forced by pumps 78 and 79 passes into ducts 117, 116, and 115, Figures 10 and 11, to the front end of the hydraulic cylinder 56.

When the inlet control valve 92 has been moved to the position shown in Figure 13, the port 84 will be opened and oil may be drawn from the pump case in direction indicated by arrow 102 into the duct 89 and into the pumps 76 and 77. Upon their power strokes the oil is forced past their outlet check valves into ducts 88, 96, and 97, Figure 10, into the rear end of the hydraulic cylinder.

An outlet sleeve 105, shown in partial section in Figure 14, is identical in construction with the inlet sleeve 83 and is forced tightly into a hole bored in the pump body 71 with its center opening 109 connecting with an outlet 112 in the pump body as shown in Figures 13 and 16, its port 108 connecting with a branching duct 111 and its port 110 connecting with a branching duct 113 as shown in Figure 13.

Inserted in the sleeve 105 with a very close sliding fit therein is an outlet control valve identical in construction with the inlet control valve 92 as shown in Figures 13, 14, 16, 17, 18, and 19.

The outlet control valve 104 is hinged to the upper end of a lever 99 and the inlet control valve 92 is hinged to the lower end of the same lever as shown in Figures 13, 11, 17, 18, and 19. The lever 99 is provided at its center with a fixed bearing shaft 100 which extends through a bearing boss 101 of the pump body 71 in which it is free to partially rotate.

When the lever 99 is swung to a position where its axis coincides with a line 121, Figure 13, the inlet ports 84 and 86 are completely closed by the inlet control valve 92 and the outlet ports 108 and 110 are completely closed by the outlet control valve 104. Any movement of the lever 99 will then open one of the outlet ports and at the same time will open the opposite inlet port to like extent.

The end of the shaft 100 extending through the bearing boss 101 is fixed to the end of an upward extending lever 135, Figures 11, 10, 17, 18 and 19, by which the movements of the valves 92 and 104 are controlled.

The upper free end of the lever 135 is connected by a link 137, Figures 17, 18 and 19, to the rear end of a lever 138 which is pivoted at its center to the end of an arm 139 of a differential lever 141 which is pivotally secured at 143 to a fixed boss 144 of the pump body 71 as shown in Figures 10, 11, 17, 18 and 19, and the free end of the differential lever 141 is pivotally secured to one end of a link 164 which is pivotally secured at its opposite end to a governor bar 165 as shown in Figures 12, 17, 18 and 19.

The governor bar 165 is rigidly secured to the rear end of the piston rod 55 as shown in Figures 10 and 12, and any movement of the piston 58 is transmitted to the center pivoted connection of the lever 138 with the arm 139.

The front end of the lever 138, previously described, is pivoted at one end of an operating link 146, Figures 17, 18 and 19. The opposite end of the link 146 is provided with a triangular opening in which is a driving notch 157, dash and dot lines in Figure 19, in which a pivot projection 158 on the forward end of a lever 160 is held by a spring 161 to move together, Figures 17, 18 and 19.

The lever 160 is pivoted at its center to a governor lever 167 which is pivoted at its forward end to a fixed boss 170 of the pump case 65, Figure 10, and provided with an arm 171 connected by a spring 172 to a fixed point on the case 65 to force a roller 169 at the free end of the governor lever against a profiled face of a governor plate 174 which is fixed to the governor bar 165, Figures 17, 18 and 19.

Figure 6:
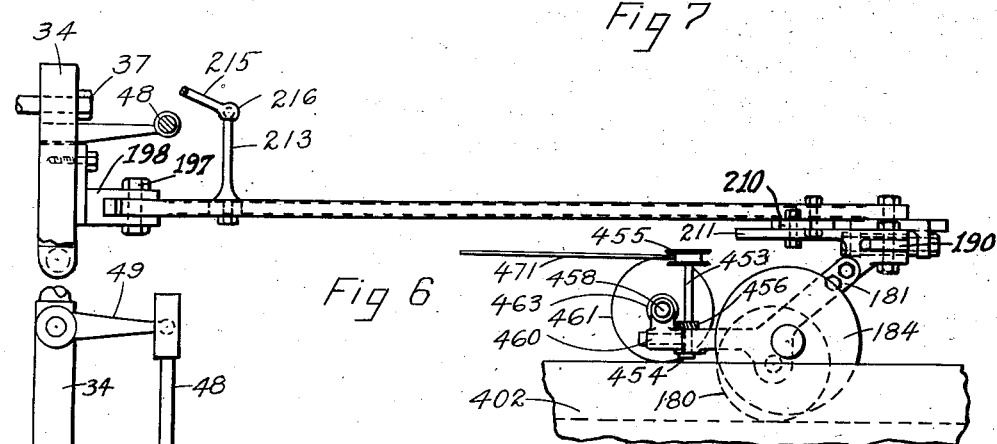
Figure 6 is a side view of the contact arm and associated parts.

The rear end of the lever 160 is pivoted to one end of a link connection 168, Figures 1, 12, 17, 18 and 19, which is pivoted at its opposite end to an upward extending arm 224, Figures 1 and 2, of a bell crank shaft 219 held to the tractor frame by bearing brackets 221 and 222. A downward extending arm 218 of the shaft 219 is connected by a ball and socket joint to one end of a link 215. The opposite end of the link 215 is pivoted at 216, Figure 6, to a projection 213, Figures 1, 2 and 6, secured to the top of a forward extending guide arm 196 pivoted at its rear end to a plate 198 secured to the front of the tractor frame. The guide arm 196 is under tension and is flanked by a bar 201 under compression and having a rack engagement at its rear end with the plate 198 to which the bar is flexibly held by a pin extending through an enlarged opening 205, Figure 5. The bar 201 is pivoted at its forward end to sidewise extending bars 206 and 192, Figures 1 and 5.

Figure 5:
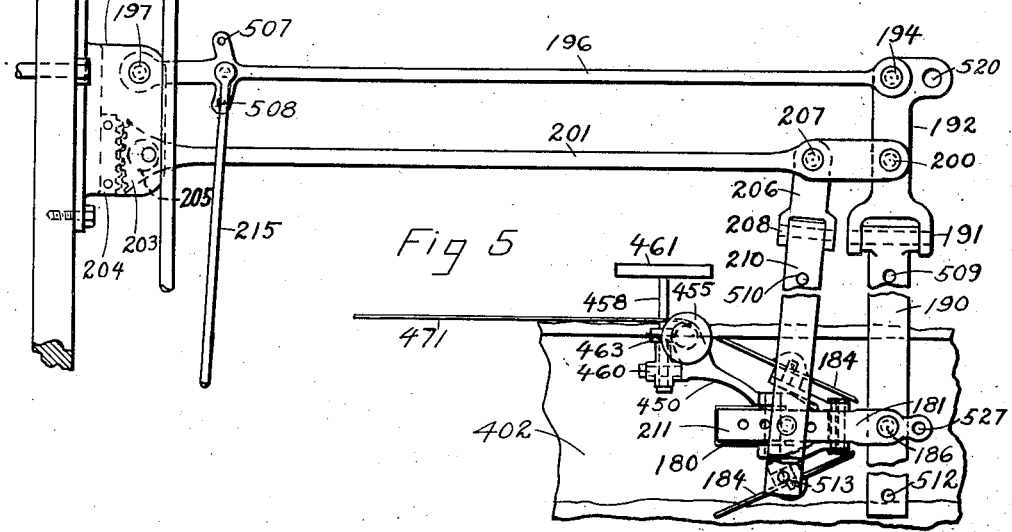
Figure 5 is a detailed plan view of the contact arm and associated parts.

The guide arm 196 is also pivoted at 194 to the bar 192 to which a bar 190, Figures 1, 2 and 5, is hinged to swing upward together with a bar 210 hinged to the bar 206.

A furrow wheel 180, Figures 1, 2, 5 and 6, flanked on either side by furrow retaining side wheels 184, serves as a furrow contact mechanism when plowing.

A plow consisting of frame members 234, 235 and 237, Figure 1, carried by a furrow wheel 241 and a land wheel 240 journaled on a swinging axle member 242, and by a caster wheel 238, and provided with plows 231 and 232, is connected to the tractor by draw bars 517 and drawn thereby.

The plows are raised and lowered at the corners of the field by means of a power lift incorporated in the land wheel and shown in Figures 1 and 4. It is in common use and is automatically operated by means of trip cords 258 and 269 connected to rearward extensions 264 and 276 of the tractor. A bell crank shaft 267 carrying an upward extending arm 278 and a downward extending 266 is positioned by a linked connection 273 to the axle member 242 to maintain a tension on the trip cords to raise the plows when turning the corners and to lower the plows when the corner is passed.

A marker plow 290, Figures 1 and 7, is hinged at 502 to the plow 232 to swing vertically. It is supported by a land wheel 293 to clear the bottom of the furrow made by the plow 232 when plowing but when that plow is raised at the corners, makes a furrow to be followed by the guide arm furrow wheel 180.

The operation of the power guide mechanism is as follows:

If the tractor be following the guide arm and its furrow wheel, in a straight furrow, neither the guide arm nor the steering wheels of the tractor will be deflected in direction relative to the body of the tractor but both will be in their straight ahead position. The piston 58 will then be in its mid position as shown in Figure 10, due to its operative connection to the steering wheels, thus bringing the governor bar 165, the link 164, and the differential lever 141 to the position indicated by full lines in Figure 17. At the same time, the link 168, the lever 160, and the link 146 will take the position shown in Figure 17 due to their operative connection to the guide arm. As the lever 138 is controlled by its connection to both the link 146 and to the arm 139 of the differential lever 141, the control valves 92 and 104 will both be in their closed position as shown by full lines in Figure 17.

If the guide arm be in its straight ahead position relative to the body of the tractor, as above described, but the steering wheels are deflected slightly toward the right, as will take place when the tractor is straightening out from a slight right hand turn or when the steering wheels of the tractor have been deflected slightly toward the right by striking the side of an object in their path with sufficient force to drive a small amount of oil past the closed outlet valve, the piston 58 will be moved closer to the rear end of the hydraulic cylinder than shown in Figure 10 and the governor bar 165, the link 164, and the differential lever 141 with the control valves 92 and 104 will be moved to the positions shown by dash and dot lines in Figure 17. When in this position, the control valve 104 has opened the outlet port 110 to permit of oil being freely discharged from the front end of the hydraulic cylinder, and at the same time, the inlet control valve 92 has opened the inlet port 84 admitting oil to the pumps 76 and 77 which oil is then forced into the rear end of the hydraulic cylinder, moving the piston 58 in the direction of the arrow 82 to its mid position and bringing the governor bar, the link 164, the differential lever 141, the lever 138, and its controlled valves 92 and 104 to the full line position shown in Figure 17 where all ports are again closed by the control valves and the tractor will continue straight ahead.

It will be noted that the roller 169 at the free end of the lever 167 contacts with a straight portion 436 of the governor plate 174 when the governor plate is moved to the dash and dot position shown in Figure 17 as well as when in its mid position shown by the full lines and the lever 167 consequently remains stationary. If the governor plate be removed and the lever 167 remain fixed in the position shown in Figure 17, the control valves 92 and 104 will always be in their closed position when the steering wheels of the tractor are in position to follow the guide arm. This will be the case whether the tractor be moving straight ahead or be turning in either direction on any curve, and any variation in direction of guide arm and steering wheels will open the control valves in a direction to force the steering wheels to follow the guide arm and to close the control valves when the steering wheels have responded whether moving straight ahead or in turning.

In turning corners automatically in plowing, it is desirable that the steering wheels of the tractor do not exactly follow the path determined by the guide arm, as above described but vary therefrom during a portion of the curve.

Figure 9 shows the approximate conditions met with when turning a left hand corner, a full line 305 representing the path followed by the guide, a dotted line 306 representing the path followed by the furrow steering wheel of the tractor to permit of the marker plow 290 making its proper guide furrow which is represented by a light line 307. The limits of the corner are represented by light lines 309 and 310 with the direction of movement indicated by an arrow 312.

Figure 8 shows the approximate conditions met with in turning a right hand corner in plowing. A full line 315 represents the furrow being followed by the guide, a dotted line 316 representing the path followed by the furrow steering wheel to permit the marker plow 290 making its proper guide furrow represented by a light line 317. The corner limits are indicated by lines 319 and 320 and the direction of tractor movement is indicated by an arrow 322.

Figure 18 shows the action of the governor plate 174 when making a left hand turn where it is desired that the steering wheels do not exactly follow the guide arm for a portion of the curve. The governor plate is provided with a profiled face 438 supplemented with a profiled face 432 and when the steering wheels have been turned enough to move the governor plate to a position where the roller 169 is brought into contact with the face 438, when starting a left hand turn, the lever 167 is deflected and due to the pivotal connection of the lever 160 thereto, the direction of the guide arm and of the steering wheels is changed relative to each other. When the steering wheels have been turned their full extent, the roller 169 will contact with the face 432 as shown in Figure 18 and the relative deflection of steering wheels and guide arm will be reduced from the maximum deflection.

The profiling of the faces 438 and 432 should be such as to deflect the steering wheels enough to bring the marker plow 290 into its proper path as indicated in Figure 9.

In making a right hand turn, the governor plate 174 is brought to the position shown in Figure 19 when the steering wheels have been fully deflected and the roller 169 is brought into contact with a profiled face 434 after being in contact with a profiled face 439 during a portion of the turning movement. In this position, the lever 167 is deflected in the opposite direction from that previously described and the lever 160 is likewise deflected in the opposite direction, changing the relative deflection of the guide arm and the steering wheels. The profiling of the faces 434 and 439 should be such as to bring the marker plow to make a proper path during its marking period as indicated in Figure 8.

A manually operated steering mechanism adapted to operate the control valves 92 and 104 by disconnecting the guide arm, consists of a light shaft 151, Figures 1, 12 and 19, secured to the frame by a rear bearing 152, Figure 1, and by a front bearing 153, Figure 19, in both of which it is adapted for rotary and endwise movement. The shaft is provided at its rear end with a handle 150, Figure 1, secured thereto, and is provided at its front end with an upward extending arm 155, Figure 12, which extends through an opening 156, Figure 18, in the lever 146. Pressure on the handle 150 in a forward direction serves to overcome the spring 161 and thus disconnect the pivot connection 158 of the lever 160 from the driving notch 157 as shown in Figure 19 and thus disconnect the guide arm from its control of the control valves 92 and 104 and giving complete manual control of the steering mechanism.

A modification of the guide arm is shown in Figures 20, 21 and 22. It consists of a bell crank lever comprising a shaft 401, Figure 21, supported in bearings 403 and 404 secured to the upper part of the tractor. This shaft has a downward extending arm 405, Figures 20, 21, and 22, extending ahead of the tractor as shown in Figure 22. It is provided at its rear end with an upward extending arm 410 to which a link 412 is pivoted at one end. At its opposite end the link is pivoted to the rear end of the lever 160, Figure 21, previously described and the operation of the control valves 92 and 104 by the modified form is identical with that of the preferred type of guide arm.

In plowing or kindred operations, a contact shoe 407 is fixed to the arm 405 to swing vertically at 406, Figures 20 and 21, and the guiding contact maintained by a spring 408 as shown in Figure 20.

When used with standing grain, the contact shoe 407 is removed and a contact shoe 415, Figure 22, fixed in its place and forced against the side of standing grain 414 by the spring 408 previously described.

The hydraulic power mechanism and the manual control therefor herein described is the same as that claimed in a co-pending application Serial No. 538,308 which is a division of this application.

I do not wish to be limited as to the type of path adapted to be followed by the guide nor as to the mechanism used to operate the steering mechanism when the guide and the steering mechanism are deflected relative to each other but claim the above described invention broadly and all equivalents.

I claim:

1. A tractor, a steering mechanism for said tractor, a power mechanism to move said steering mechanism, a guide adapted to follow a path, and a control for said power mechanism to move said steering mechanism in the direction and to the extent determined by said guide when said guide and said steering mechanism have been deflected relative to each other.

2. A tractor, a steering mechanism for said tractor, a guide adapted to follow a path to control said steering mechanism, said path also followed by said tractor, and a control interposed between said guide and said steering mechanism to divert the tractor from the path followed by said guide when turning corners.

3. A tractor, a steering mechanism for said tractor, a guide adapted to follow a path, and a power mechanism comprising a movable element operated by power and operatively connected to said steering mechanism and comprising a power control to determine the movement of said movable element, said guide adapted to operate said power control to turn said steering mechanism in the direction determined by said guide and said movable element adapted to operate said power control to stop the movement of said steering mechanism when it has reached the position determined by said guide.

4. A tractor, a steering mechanism for said tractor, a guide adapted to follow a path also followed by said tractor, a power mechanism comprising a movable element operated by power and operatively connected to said steering mechanism and comprising a power control to determine the movement of said movable element, said guide adapted to operate said power control to move said steering mechanism in a direction to bring the tractor back into its path upon leaving same and said movable element adapted to operate said power control to stop the movement of said steering mechanism when it has completed the movement determined by said guide and before said tractor has returned to its path.

5. A tractor, a steering mechanism for said tractor, a power mechanism adapted to operate said steering mechanism, a guide adapted to follow a path also followed by said steering mechanism and adapted to operate said power mechanism, and a control interposed between said guide and said power mechanism to divert the steering mechanism from the path followed by said guide when turning corners.

6. A tractor, a steering mechanism for said tractor, a power mechanism to operate said steering mechanism, a guide adapted to follow a path to operate said power mechanism to determine the path followed by said steering mechanism, and a control adapted to change the operation of said power mechanism by said guide to divert the steering mechanism from its path when turning corners.

7. A tractor, a steering mechanism for said tractor, a power mechanism comprising a movable element operated by power and operatively connected to said steering mechanism and comprising a power control to determine the movement of said movable element, a guide adapted to follow a path and adapted to operate said power control to turn said steering mechanism in the direction determined by said guide and said movable element adapted to operate said power control to stop the movement of said steering mechanism when it has reached the position determined by said guide, in combination with a manual control adapted to render said guide inoperative in its operation of said power control and to operate same manually.

8. A tractor, a steering mechanism for said tractor, a guide adapted to follow a path, and a power mechanism comprising a movable element operated by power and operatively connected to said steering mechanism and comprising a power control to control the movement of said movable element, said guide adapted when deflected to operate said power control to start the movement of said movable element in the direction determined by said guide, and said movable element adapted to operate said power control to stop the movement of said movable element when it has reached the position determined by said guide.

9. A tractor, a guide adapted to follow a path, a steering mechanism for said tractor, a power mechanism, and a control for said power mechanism operatively connected to said guide and to said steering mechanism and adapted to operate said power mechanism to move said steering mechanism in the direction determined by said guide when said guide and said steering mechanism have been deflected in direction relative to each other.

10. A tractor, a guide adapted to follow a path, a steering mechanism for said tractor, a power mechanism, and a control for said power mechanism operatively connected to said guide and to said steering mechanism and adapted to operate said power mechanism to move said steering mechanism in the direction determined by said guide when said guide and said steering mechanism have been deflected in direction relative to each other and independent of the deflection of said guide relative to said tractor.

11. A tractor, a guide adapted to follow a path, a steering mechanism for said tractor, a power mechanism to move said steering mechanism, and a control for said power mechanism adapted to move said steering mechanism in the direction and to the extent determined by said guide when said guide is deflected in direction relative to said steering mechanism and to said tractor.

12. A tractor, a guide adapted to follow a path, a steering mechanism for said tractor, a power mechanism to move said steering mechanism, and a control for said power mechanism adapted to move said steering mechanism in the direction and to the extent determined by said guide when said guide is deflected in direction relative to said steering mechanism and independent of the deflection of said guide relative to said tractor.

13. A tractor, a guide adapted to follow a path, a steering mechanism for said tractor, a power mechanism to move said steering mechanism, and a control for said power mechanism adapted to move said steering mechanism in the direction and to the extent determined by said guide when said guide is deflected relative to said steering mechanism.

14. A tractor, a guide adapted to follow a path, a steering mechanism for said tractor, a power mechanism, and a control for said power mechanism operatively connected to said guide and adapted to operate said power mechanism to move said steering mechanism in the direction and to the extent determined by said guide when said guide and said steering mechanism have been deflected relative to each other.

15. A tractor, a steering mechanism for said tractor, a power mechanism to operate said steering mechanism, and a guide adapted to follow a path to control said power mechanism to move said steering mechanism in the direction and to the extent determined by said guide when said steering mechanism and said guide are deflected relative to each other, in combination with a manual control adapted to render said guide inoperative in its operation of said power mechanism and to control said power mechanism to move said steering mechanism in the direction and to the extent determined by said manual control when said steering mechanism and said manual control have been deflected in driving direction relative to each other.

CHARLES K. SALISBURY.